Dec. 1, 1959 M. C. PFISTER 2,915,676

HEAVY DUTY CONTROL WITH ELECTRONIC ACCURACY

Filed Nov. 13, 1958 2 Sheets-Sheet 1

INVENTOR.

Pfister Marcel Charles

Dec. 1, 1959 M. C. PFISTER 2,915,676
HEAVY DUTY CONTROL WITH ELECTRONIC ACCURACY
Filed Nov. 13, 1958 2 Sheets-Sheet 2
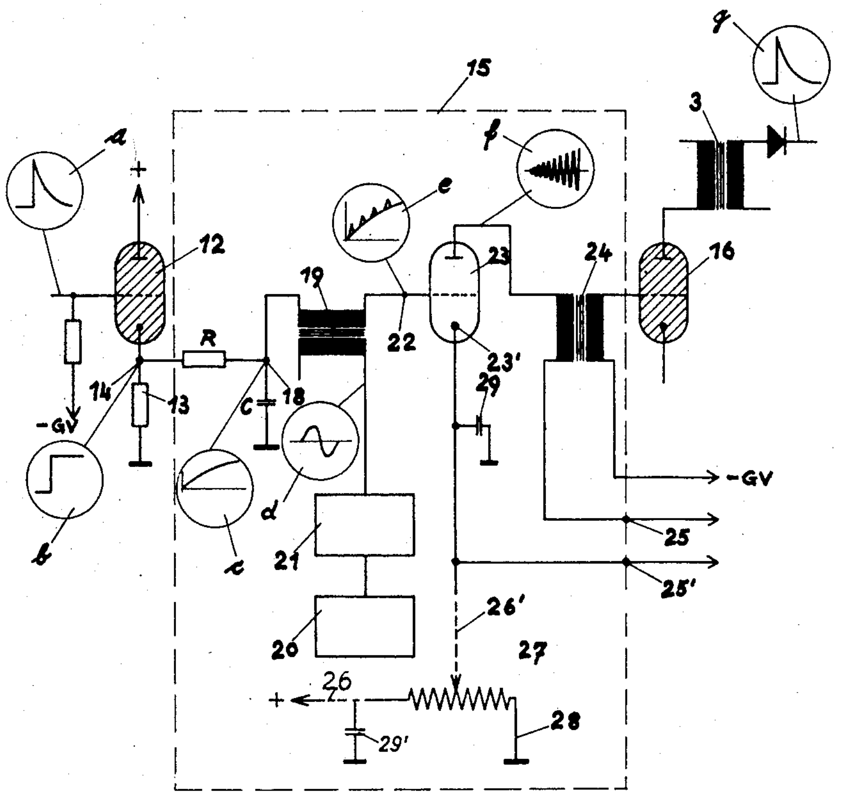
Pfister Marcel Charles
INVENTOR.

United States Patent Office 2,915,676
Patented Dec. 1, 1959

2,915,676

HEAVY DUTY CONTROL WITH ELECTRONIC ACCURACY

Marcel Charles Pfister, Eckbolsheim, near Strassburg, France

Application November 13, 1958, Serial No. 773,798
Claims priority, application Germany November 13, 1957
12 Claims. (Cl. 315—163)

This invention relates to an electronic control system. In one aspect it is concerned especially with providing the dependable exactness in time of operation provided by an electronic control system for some very difficult heavy-load applications such as the various devices of rolling mills.

In many cases, only an electronic impulse which may be obtained from a photoelectric cell or a heat sensitive variable resistance cell (PbS cell), for instance, is available to effect the initiation of the control operations. If electrically powered devices drawing heavy power loads must be controlled by means of such an impulse which can, of course, be pre-amplified, certain difficulties are encountered. As is well known, a thyratron can be ignited by such an electronic impulse; so that thereby a greater power can be switched on. But where extremely high-power requirements are present, as operation of rolling-mill shears, loop lifters, brakes, etc., for instance, very large and expensive thyratrons would be required which, especially with rough operations, are greatly endangered and can only be accommodated with such difficulties that this scheme is likely to be deemed impractical.

In view of these difficulties, in prior art practice greater power has chiefly been controlled by means of mechanical contactors where such a contactor device was controlled by the electronic impulse with the help of mechanically operating relays. Such a relay control of contactors, however, has the disadvantage that uncontrollable and non-constant relay-armature delays occur which makes it impossible to switch on the power circuit with the exactitude of timing represented by milliseconds. The relay-armature delays may vary considerably as a function of frictional resistance, mass forces, temperature and other influences. In some cases, a succession of such relays will be necessary which causes these variations to add up and lead to even greater non-permissible time errors. With high rolling speeds, time errors which are very small may influence considerably the quality of the rolled stock. Even with uniformity of timing of the control, any delay introduces errors if the rolling speed is not always the same. Accordingly, relay control of contactors must be considered unsuitable or disadvantageous for many control purposes.

The present invention has therefor for its object to provide a novel arrangement by means of which a heavy power load device is controlled by an electronic impulse without the time errors mentioned and without the necessity to use a thyratron corresponding in size to one which could maintain the current capacity to be controlled.

The invention starts out from the perception that a thyratron can be greatly overloaded, provided this overloading takes place only during a sufficiently short time.

Starting out from this knowledge, the problem described is solved in accordance with the invention by the momentary use of an overload thyratron. In this arrangement, a mechanical contactor device is controlled via relays by the electronic impulse. It has the function of closing the power circuit independently of the thyratron and at the same time disconnects the thyratron from the power circuit. Thus, a twofold control is effected by the initiating electronic impulse. The first is a thyratron actuated starting operating without relay time error. The second is an electronic-mechanical switching, with time error now having no significance, by which the overloaded thyratron is quickly relieved of its load. In this way, it is possible, even for great current intensities, to use a relatively small thyratron which can be arranged safely in a cabinet type control apparatus. The passage of current through the thyratron will only last a fraction of a second's time until the electronic-mechanical switching has followed.

Sometimes it will be necessary that switching-on the load current take place after a certain interval of time after the initiating pulse occurs. In the rolling mill, for instance, power supply to the rolling mill shears must be effected a predetermined period after the occurrence of the control impulse caused by entrance of the rolled stock into the shears. According to prior art practice, the input relay of a time-delay switch has for this purpose been excited with the preamplified electronic impulse. The load contactor was then controlled by the output relay pulling up after a certain delay time. With such a series connection of several relays, the time errors mentioned will become apparent in an increased manner, so that the intended time delay cannot be maintained with the exactness necessary.

According to another aspect of the invention therefore, the electronic impulse actuates first an electronic no-contact pre-control device operating with accurate time delay, and the thyratron and mechanical contact making device both controlled by the output current of the pre-control device. The mechanical contact making device may be so designed that simultaneously with switching off the high-voltage thyratron, the pre-control device is switched off. With such a no-contact pre-control device operating the thyratron type of main control, there is neither in the input nor in the output of the time delay device any mechanical contact necessary for the initial closing of the main controlled circuit. A preferred pre-control provided by this invention uses one auxiliary thyratron connected in front of the time relay and another auxiliary thyratron is connected after it, both of which are actuated without any time error.

Various types of time delay relays, used with different circuit arrangements, are well known. Generally, an input voltage is applied to the grid of an amplifier valve or tube via a resistance-capacitance network, and a modulator superimposes thereon an alternating voltage. The amplifier tube will then amplify the slowly increasing modulating grid voltage in accordance with the potential difference existing between the grid and the cathode, so that a switching element arranged in the anode circuit responds at the moment when a certain amplitude is surpassed. For the purpose of adjustment of the delay time with such time relays, it has been common practice to vary the resistance of the resistance-capacitance network applied to the grid of the amplifier tube. For the purpose of delay time adjustment, this prior art system requires a disturbance-sensitive grid lead to be extended to the point of adjustment. But, especially with the electronic control systems of the type under discussion, this is highly undesirable and disadvantageous because the extended grid lead of the time delay relay is often subjected to induction influences of heavy electric machinery. It is therefore highly desirable to find a possibility where an exact adjustment of the delay time can be effected with the resistance-capacitance network remaining constant. According to one aspect of the present invention, this object is accomplished by using a variable resistance connected in a manner to control the potential difference or normal bias existing between the grid and the cathode before the timing by dissipation of this bias starts. The resistor used for the adjustment of the normal grid bias or cathode potential may then be connected via remote lines. Disturbances due to induction which might still be present can then easily be eliminated by grounding these remote lines through filter members or capacitors, when they are such, as shown, that they can be thus grounded without adverse effects.

Additional advantages and objects of the invention will be apparent from the following description and the drawings.

DESIGNATION OF FIGURES

Fig. 3 is a circuit diagram, with wave shapes shown at different points, of an electronic time delay system embodying some special features, and showing its relationship to the circuit of Fig. 2, in which it may be used.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

Typical embodiments of the present invention are more fully explained in the following detailed description.

Figure 1:
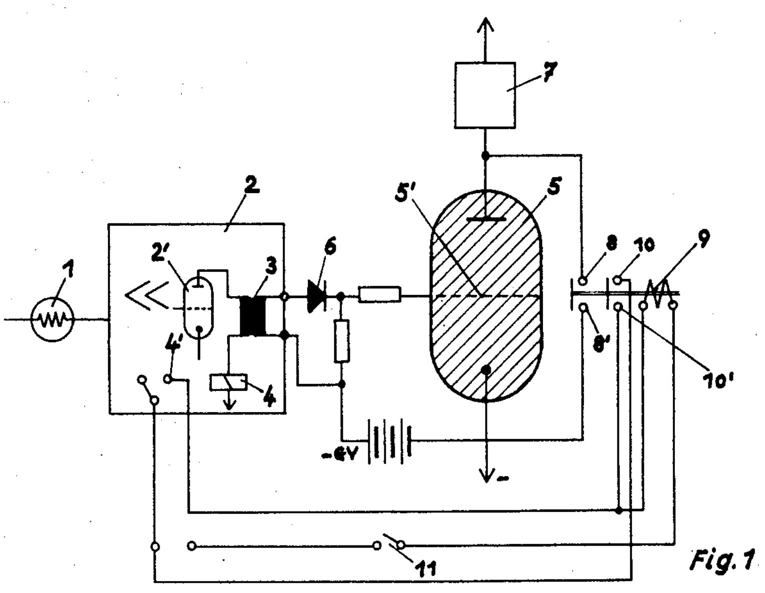
Fig. 1 is a circuit diagram of a form of the invention without time delay.

*Fig. 1.—Basic dual closing*

In the embodiment selected for illustration without time delay, numeral 1 designates an electronic impulse transmitter which may be a variable resistance cell, or photocell, for instance, which is connected to an amplifier 2. A transformer 3 and an electromechanical relay 4 are in the anode circuit of the output tube 2′ of the amplifier 2. By means of the transformer 3 and through a rectifier 6 the anode circuit is coupled with the negative biased grid 5′ of a high-voltage thyratron 5. A power consuming device 7 which is assumed to draw power far beyond the normal rating of thyratron 5 is connected to the anode circuit of the thyratron 5. Parallel to the thyratron 5 are the working mechanical contacts 8, 8′ of a power relay 9 which may be switched on by the relay 4 through the working contact 4′ of the latter relay. The numerals 10, 10′ designate holding contacts of the contactor 9. Numeral 11 is a normally closed contact which is opened by the controlled device 7 after the working operation has been completed.

If now the impulse transmitter 1 transmits an impulse into the amplifier 2, the high-voltage thyratron 5 is ignited by the output voltage of the amplifier 2 which is due to a variation of the potential on the grid 5′, and the controlled power consuming device 7 is in effect switched "on." This action is purely electronic and is effected without any mechanical contacts causing time errors. At the same time, however, the relay 4 is excited which switches on the power relay 9. Upon tripping of the power relay 9 the power circuit is additionally closed through the working contacts 8, 8′. This not only supplies device 7 independently of thyratron 5, but also short circuits the thyratron and extinguishes it. Due to the tripping items of the relay 4 and the power relay 9, this action takes place with a certain non-constant delay. However, the thyratron 5 is only in operation during this delay period and therefore may be heavily overloaded, far beyond its maximum average anode current rating. The power consuming device 7, however, is energized without delay promptly upon receiving the initiating impulse from the impulse transmitter 1. The holding contacts 10, 10′ have the function of maintaining the power relay 9 in its switching position even after the relay 4 has released until the power consuming device 7, after having performed its working step, actuates the switch 11.

Figure 2:
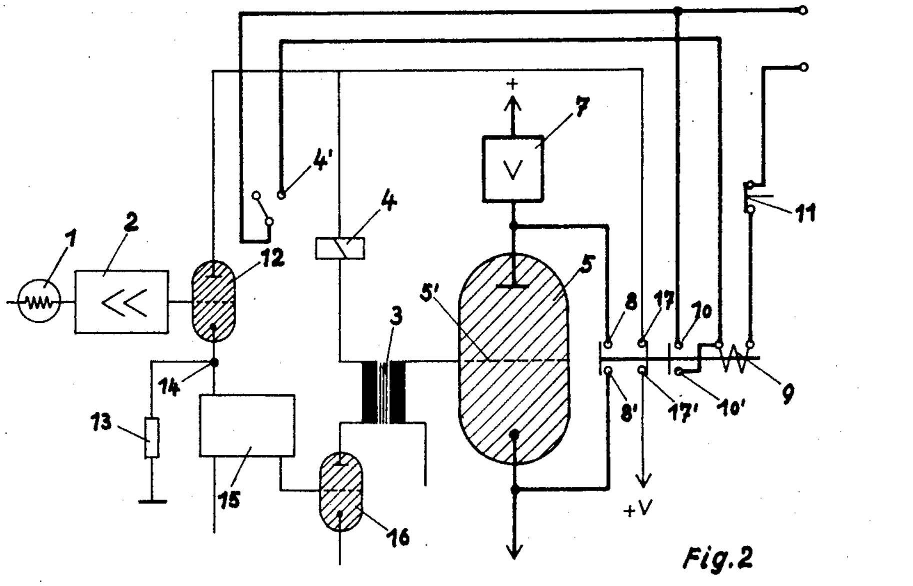
Fig. 2 is a circuit diagram for modification of the invention incorporating electronic time delay.

*Fig. 2.—Time delay added*

Fig. 2 shows a circuit diagram in which the initiating electronic impulse transmitted by the impulse transmitter 1 does not ignite the high-voltage thyratron 5 directly but through a time delay system. The output voltage of the amplifier 2 ignites an auxiliary thyratron 12 which is connected in parallel with a resistor 13 in a voltage divider circuit. The voltage leap occurring at the point of connection 14 upon ignition of the auxiliary thyratron 12 is fed as input voltage into a time delay system 15, described in connection with Fig. 3. Another auxiliary thyratron 16 is then ignited by the delayed output voltage of the time delay system 15. The relay 4 and the coupling transformer 3 are arranged in the anode circuit of the auxiliary thyratron 16. The two auxiliary thyratrons 12 and 16 receive their anode voltage via a normally closed contacts 17, 17′ of the power relay 9.

The auxiliary thyratron 12 is ignited by the electronic impulse generated by the impulse transmitter 1, and thereupon the time delay system 15 receives its input voltage. The auxiliary thyratron 16 is ignited with a delay which can be adjusted in the time delay system 15, so that through the transformer 3 a voltage pulse is transmitted to the grid 5′ of the high-voltage thyratron 5 and the power consuming device is energized. This action is all effected purely electronically, i.e., without any mechanical contacts, so that the delay time of the time delay relay 15 is absolutely constant and the energization can be dependably free from time errors. At the same time—as in Fig. 1—the relay 4 and the power relay 9 are energized, the contacts 8, 8′ of the latter short circuiting the high-voltage thyratron 5. Opening of contacts 17, 17′ also simultaneously causes the auxiliary thyratrons 12 and 16 used for pre-control to extinguish. Consequently, also the two auxiliary thyratrons 12 and 16 only remain in operation until the contactor 9 has tripped.

The interruption of the anode circuit of the auxiliary thyratrons 12 and 16 may alternatively be effected by any other auxiliary means, such as by contacts operated by the power consuming device 7, for instance, after it has completed its working step. Thus the auxiliary thyratrons 12 and 16 may remain ignited and prevent the passage of a new control impulse as long as the program of the first control has not yet been completed.

*Remotely adjustable time delay*

Fig. 3 shows the circuit arrangement of the preferred form of time delay system 15, which may also be designed in any other suitable manner, at least if this aspect of the invention is not needed. For the sake of a better understanding, oscillograph records showing wave forms of the impulses have been represented at the different points of the circuit.

The electronic control impulse shown on the record *a* and which is used to ignite the auxiliary thyratron 12 appears on the grid of the auxiliary thyratron 12, igniting this thyratron. A voltage leap in accordance with the record *b* is thereby produced on the connecting point 14. A resistance-capacitance network is connected to the connecting point 14, so that a gradually increasing voltage in accordance with the oscillograph record *c* is produced at 18, the characteristic of the voltage increase depending on the characteristics of the network. An alternating voltage (see *d*) of 1000 cycles per sec., for instance, which is generated by an oscillator 20 and regulated by a stabilizer 21 is superimposed on this slowly increasing voltage by a transformer 19.

A slowly increasing modulated voltage according to the record *e* is therefore found at 22 on the grid of the amplifier valve 23. When this voltage is less negative with respect to the cathode 23′ of the amplifier valve 23 than the cut-off bias, it has a pulsating output of increasing values. See the record *f*. The anode circuit of the amplifier 23 is coupled with the grid of the auxiliary thyratron 16 through a coupling transformer 24. Thus, as soon as the amplitude of the amplified voltage produced in the secondary of transformer 24 surpasses the ignition grid voltage of the auxiliary thyratron 16, ignition of the latter thyratron takes place. A voltage impulse according to record *g* is thereby produced in the secondary winding of the transformer 3, this voltage impulse corresponding approximately to the initiating impulse according to record *a*, but delayed a definite time by the time delay system 15.

The amplifier tube 23 is supplied with current from a current to be connected to the terminal 25 and ground. The cathode of tube 23 is applied to the tap 28 of a voltage divider 27 which is connected between lead 26 and ground. Lead 26 may be connected to terminal 25. The voltage divider 27 and the tap 28 are connected through lines 26, 26' which may be extended to locate divider 27 at a convenient location for manual adjustment. The potential of the cathode 23' or the normal bias of its grid, may be varied by shifting the tap 28. In this manner it is possible to adjust the potential difference between the grid and the cathode 23' and, without varying the resistance-capacitance network applied to the grid, it is possible to adjust the delay time of the time delay system to a desired value. The remote lines 26, 26' may be long enough to be led to a switch desk which is arranged at a considerable distance from the time delay system 15. In order to eliminate any influence due to induction which may affect the remote lines 26, 26', these may be grounded through filter elements or capacitors 29, 29'.

It is apparent that the thyratron 12 and its associated elements comprise an electronic device, which is impulse-triggered and self-maintained, for dissipating or altering the charge on capacitor C from its normal value at a predetermined rate, and that other electronic devices for that function could be substituted.

Likewise it is apparent that tube 23, thyratron 16 and associated elements are an electronic device for providing an actuating impulse when the charge on capacitor C has been altered to a given state, and that other electronic devices for performing this function could be substituted. When remote adjustment of the delay period is needed, the substituted device should again be one having leads which when extended to a remote point can be substantially free from external influences affecting the timing, as by being grounded through filters or capacitors.

With another preferred embodiment of the invention, line 26 is connected to the anode of thyratron 12. The thyratron 12 is fed by a source of voltage different from that one which is connected to the terminals 25, 25'. Thereby the potential divider 27 is connected in parallel to thyratron 12.

I claim:

1. A heavy duty control system in which a thyratron in the load circuit to be controlled is ignited in response to an impulse, characterized by the use of an overloaded thyratron which is switched off the power circuit by a mechanical contacting device, the latter contacting device being controlled by the same impulse through relays and closing the load circuit, by-passing the thyratron.

2. A heavy duty control system including a thyratron connected to complete, upon ignition, a load circuit which would overload the thyratron if maintained through it, and an electro-mechanical switching means for completing the load circuit by a by-pass around the thyratron, and electrical means responsive to an impulse for igniting the thyratron, and substantially simultaneously energizing the electro-mechanical switching means, to close the load circuit with the dependable quickness of the thyratron and to relieve the thyratron of the load while maintaining the load circuit closed, with only the delay of operation of the electro-mechanical switching means.

3. A heavy duty control system according to claim 2 including an all-electronic time delay system responsive to an initiating impulse to provide, after a predetermined time delay, the actuating impulse.

4. A heavy duty control system according to claim 3 in which the time delay system includes an output auxiliary thyratron for producing the actuating impulse, an electronic valve connected to control said output thyratron and normally so biased as to prevent ignition of the thyratron, a resistance-capacitance network for dissipating the bias, and an initiating auxiliary thyratron connected to be ignited by the initiating impulse and to control the dissipating action of the network.

5. A control system including a thyratron connected to complete, upon ignition, a load circuit, electrical means responsive to an actuating impulse to ignite the thyratron, an all-electronic time delay system including a capacitor, an electronic device triggered by an initiating impulse for altering the charge on the capacitor from its normal state at a predetermined rate, and an electronic device for providing an actuating impulse to ignite the thyratron when the charge on the capacitor has been altered to a given state.

6. A control system according to claim 5, in which the device for providing an actuating impulse includes leads which are protected by a ground to be substantially independent of external influences.

7. A control system according to claim 5, in which the device for providing an actuating impulse includes an adjustable resistor for adjusting the amount of alteration of capacitor charge required to provide the actuating impulse, connected by leads which are protected by a ground to be substantially independent of external influences.

8. A control system according to claim 5, in which the device for providing an actuating impulse includes an adjustable resistor for adjusting the amount of alteration of capacitor charge required to provide the actuating impulse.

9. An all-electronic time delay system including an output thyratron, an initiating thyratron responsive to an initiating impulse, a grid-controlled amplifier for igniting the output thyratron, and a resistance-capacitor network normally maintaining said grid at a potential preventing ignition of the output thyratron but actuated by the arcing current through the initiating thyratron for changing the potential at a predetermined rate.

10. An all-electronic time delay system including an output thyratron, an initiating thyratron responsive to an initiating impulse, a grid-controlled amplifier for igniting the output thyratron, and a resistance-capacitor network normally maintaining said grid at a potential preventing ignition of the output thyratron but actuated by the arcing current through the initiating thyratron for changing the potential at a predetermined rate; and means responsive at least indirectly to ignition of the output thyratron for extinguishing said thyratrons.

11. An all-electric time delay system including a capacitor, an electronic device triggered by an initiating impulse and self-maintained, for altering the charge on the capacitor from its normal state at a predetermined rate, and an electronic device for providing an output impulse when the charge on the capacitor has been altered to a given state, and a remotely located adjustable resistor for varying the amount of alteration of the charge required to cause the output impulse; said resistor being connected by a lead substantially immunized from external influences.

12. A heavy duty control system according to claim 4, including means responsive at least indirectly, to the impulse for extinguishing the auxiliary thyratrons.

References Cited in the file of this patent

UNITED STATES PATENTS

| | | |
|---|---|---|
| 2,423,115 | Pouliart | July 1, 1947 |
| 2,497,505 | Martin | Feb. 14, 1950 |